United States Patent [19]

Yamamoto

[11] Patent Number: 5,789,729
[45] Date of Patent: Aug. 4, 1998

[54] DOUBLE SIDE SCANNER AND METHOD FOR CONTROLLING THE SCANNER

[75] Inventor: Keiji Yamamoto, Hunamashi, Japan

[73] Assignee: Ricoh Company, Ltd., Tokyo, Japan

[21] Appl. No.: 782,274

[22] Filed: Jan. 13, 1997

Related U.S. Application Data

[63] Continuation of Ser. No. 426,933, Apr. 21, 1995, abandoned.

[30] Foreign Application Priority Data

Apr. 28, 1994 [JP] Japan .................. 6-091216

[51] Int. Cl.[6] .................................................. G06K 7/10
[52] U.S. Cl. .................................. 235/470; 355/23
[58] Field of Search ............................ 235/462, 470, 235/379, 440; 358/400, 404; 355/319, 23

[56] References Cited

U.S. PATENT DOCUMENTS

| | | | |
|---|---|---|---|
| 5,221,830 | 6/1993 | Kern | 235/379 |
| 5,262,624 | 11/1993 | Koch | 235/456 |
| 5,282,081 | 1/1994 | Chen | 359/223 |
| 5,311,999 | 5/1994 | Malow | 209/583 |
| 5,404,004 | 4/1995 | Sato | 235/463 |
| 5,436,439 | 7/1995 | Nishimura | 235/462 |

*Primary Examiner*—Donald T. Hajec
*Assistant Examiner*—Karl Frech
*Attorney, Agent, or Firm*—Oblon, Spivak, McClelland, Maier & Neustadt, P.C.

[57] ABSTRACT

A double side scanner and method for controlling the scanner. The double side scanner performs a scanning operation of a single sheet at a same time, and the double side scanner has a memory that can store the scanned image data. A data transfer device transfers the image data from the memory to an external device.

11 Claims, 9 Drawing Sheets

DOUBLE SIDE SCANNER AND METHOD FOR CONTROLLING THE SCANNER

This application is a continuation of application Ser. No. 08/4426,933, filed on Apr. 21, 1995, now abandoned.

BACKGROUND OF THE INVENTION

1. Field of the Invention

This invention generally relates to a double side scanner, and a method for controlling the scanner. The invention is more particularly related to control data transfers which control the operation of two scanners which are part of the double side scanner and which perform a scanning operation of a single sheet at the same time or approximately at the same time.

2. Discussion of the Background

Generally, some scanning apparatuses such as electrical filing systems, optical filing systems, facsimiles, copiers, and digital copiers perform double sided scanning of a document. One style of scanner uses a single scanner and scans different sides of a page at different times. This type of scanner is disclosed in Japanese Laid-open Patent Publication No. 63262/1990.

Another type of scanner utilizes two scanners (e.g. a double side scanner) and the scanners scan the opposite sides of a single page at approximately the same time. The scanning apparatus incorporating a double side scanner has an advantage of a higher scanning speed than the scanner apparatus having one scanner. This type of double side scanner is disclosed in Japanese Laid-Open Patent Publication No. 120468/1983.

However, typical double side scanners store the data for each side which is scanned in temporary memories, and after finishing storing the data in the temporary memories, the typical double side scanner sends the data to an external device, so it takes a long time overall to send the data for each side which is scanned to the external device.

SUMMARY OF THE INVENTION

It is therefore an object of the present invention to provide a novel double side scanner for scanning each side of a page of a document, including a business card.

It is another object of the invention to provide a novel method for controlling a double side scanner.

According to one aspect on the present invention, a double side scanner includes a first scanner that can scan a first side of a sheet, to provide a first side data, and a second scanner, connected to the first scanner, that can scan a second side of the sheet to provide a second side data. A memory stores the second side data. A first data transfer device transfers the first side data to an external device and a second data transfer device transfers the second side data to the memory. Further, a third data transfer device transfers the second side data stored in the memory to the external device, after finishing data transferring by the first and second data transfer devices.

In a further aspect of the present invention, the memory has a capacity of one side of the sheet data.

According to another aspect of the invention, the double side scanner includes a first scanner, which can scan a first side of sheets to provide first side data and a second scanner, connected to the first scanner, which can scan a second side of the sheets to provide second side data. A memory stores the second side data and a first and second side data of a second sheet. A first data transfer device transfers the first side data of a first sheet to an external device and a second data transfer device transfers the second side data of the first sheet to the memory. A third data transfer device transfers the first and second side data of a second sheet to the memory. Further, a fourth data transfer device transfers the second side data of the first sheet stored in the memory to the external device. The second side data of the second sheet stored in the memory is transferred to the external device and the second side data of the second sheet stored in the memory is transferred to the external device.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
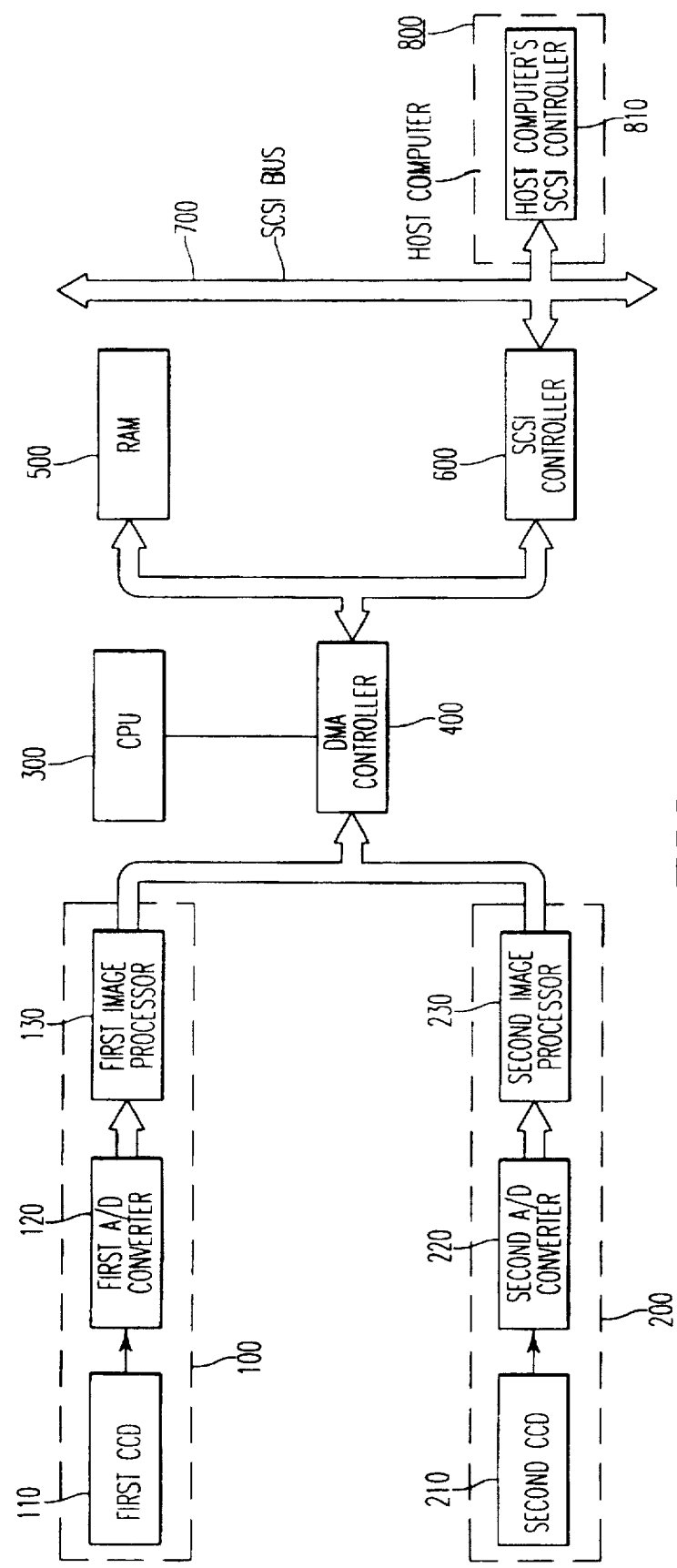
FIG. 1 is a block diagram showing a double side scanner according to the present invention.

Referring now to the drawings, wherein like reference numerals designate identical or corresponding parts throughout the several views, and more particularly to FIG. 1 thereof, there is illustrated a double side scanner used by the present invention. It is to be understood that the scanner, control system, and method of the invention can be incorporated into any type of device requiring a scanner.

As shown in FIG. 1, the scanner includes a first scanner 100, a second scanner 200, a CPU 300, a DMA controller 400, a RAM 500, a SCSI controller 600, and a SCSI bus 700.

The first scanner 100 includes a first CCD 110, a first A/D converter 120, and a first image processor 130. The second scanner 200 includes a second CCD 210, a second A/D converter 220, and a second image processor 230.

The first CCD 110 changes the image data to electrical data. The first A/D converter 120 converts analog image data from the first CCD 110 to binary or multivalue data. The first image processor 130 processes image data from the first A/D converter 120 for purposes of a binary density process, density correction, etc.

The second CCD 210 changes the image data to electrical data. The second A/D converter 220 converts analog image data from the second CCD 210 to binary or multivalue data. The second image processor 230 processes image data from the second A/D converter 220 for purposes of a binary density process, density correction, etc.

The CPU 300, which includes a ROM for storing control programs, controls each element of the double side scanner.

The DMA controller 400 controls the transfer of image data from the first scanner 100 and the second scanner 200 to the RAM 500 or the SCSI controller 600, and the transfer of image data from the RAM 500 to the SCSI controller 600.

The RAM 500 is a system memory which stores image data, and in this embodiment the RAM 500 may have a data capacity of one side of a document sheet, as an example.

The SCSI controller 600 transfers image data from the first scanner 100 and the RAM 500 to a host computer 800 by way of the SCSI bus 700 and transfers a command from a SCSI controller 810 in the host computer 800 to the DMA controller 400.

Figure 2:
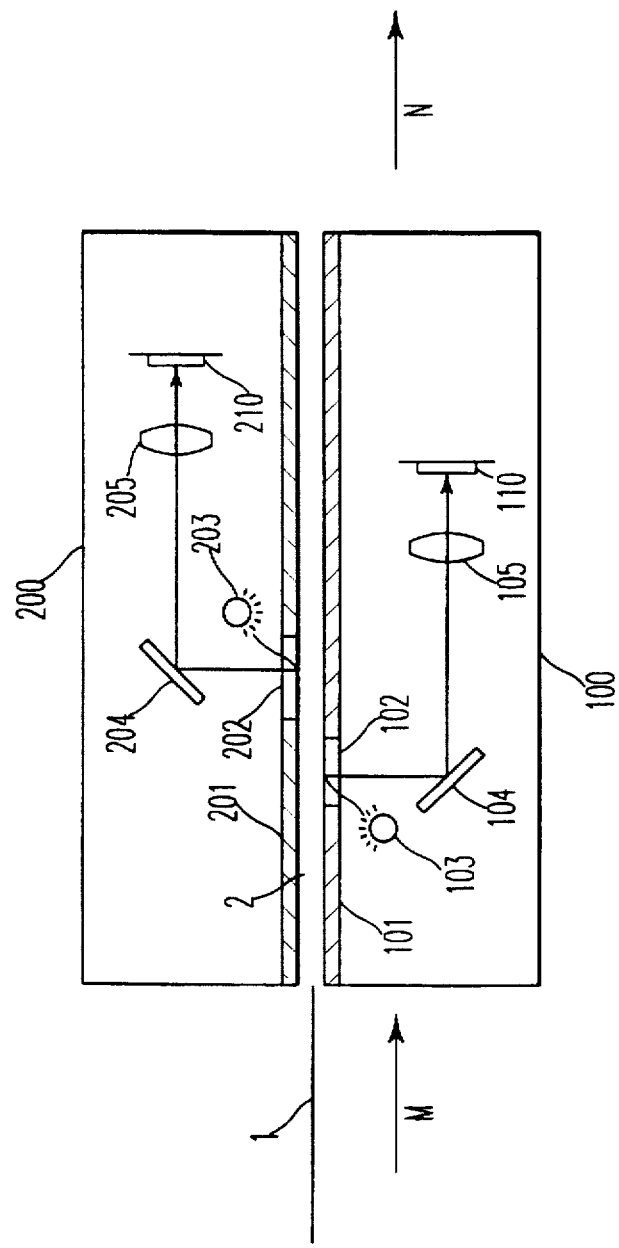
FIG. 2 is a sectional view of the double side scanner according to the present invention.

FIG. 2 illustrates a sectional view of a double side scanner. A document 1 such as a sheet of paper or business card having a double side image data thereon is conveyed in the direction as illustrated by the arrow M. The document 1 is set such that the front side is facing downwardly. The first scanner 100 for scanning front-side data 1a and the second scanner 200 for scanning back-side data 1b are located between a feed path 2. After scanning the image data, the document 1 is ejected in the direction as illustrated by the arrow N.

The first scanner 100 has a guideplate 101 guiding the front-side data 1a of the document 1. The guideplate 101 has a slit 102 having a width which is the same as the maximum document width. A light source 103 illuminates the surface of the front-side 10 of the document 1 through the slit 102. Reflected light from the front-side 10 of the document 1 is reflected by a mirror 104 through a lens 105 and forms an image on the CCD 110.

The second scanner 200 has the same structure as the first scanner 100. The second scanner 200 has a guideplate 201 guiding the back-side data 20 of the document 1. The guideplate 201 has a slit 202 having a width which is the same as the maximum document width. A light source 203 illuminates the surface of the back-side 20 of the document 1 through the slit 202. Reflected light from the back-side 20 of the document 1 is reflected by a mirror 204 through a lens 205 and forms an image on the CCD 210. The slits 102 and 202 illustrated in FIG. 2 are offset from each other in order to prevent interference with each other. By offsetting the slits 102, 202, the back-lighting by one of the lamps 103 and 203 will not affect the scanning operation of the scanner on the other side.

Figure 3:
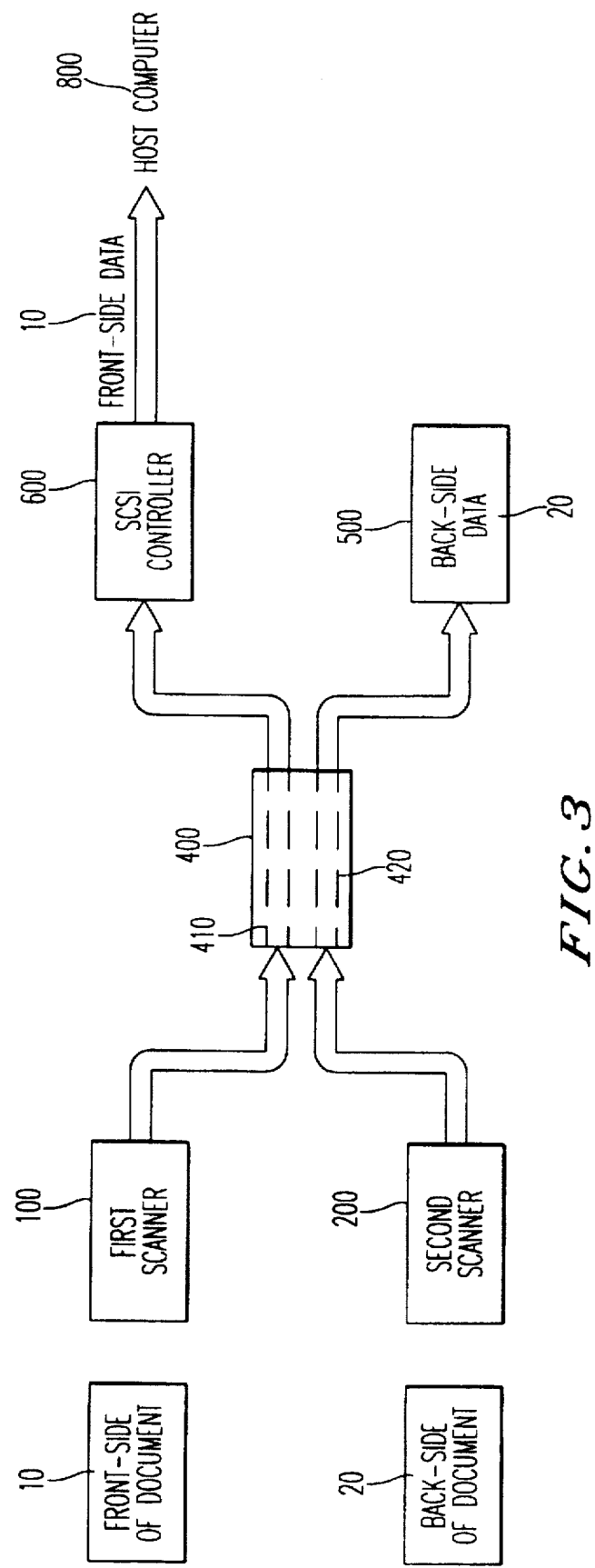
FIG. 3 illustrates flows of scanning data according to a first embodiment of the present invention.
Figure 4:
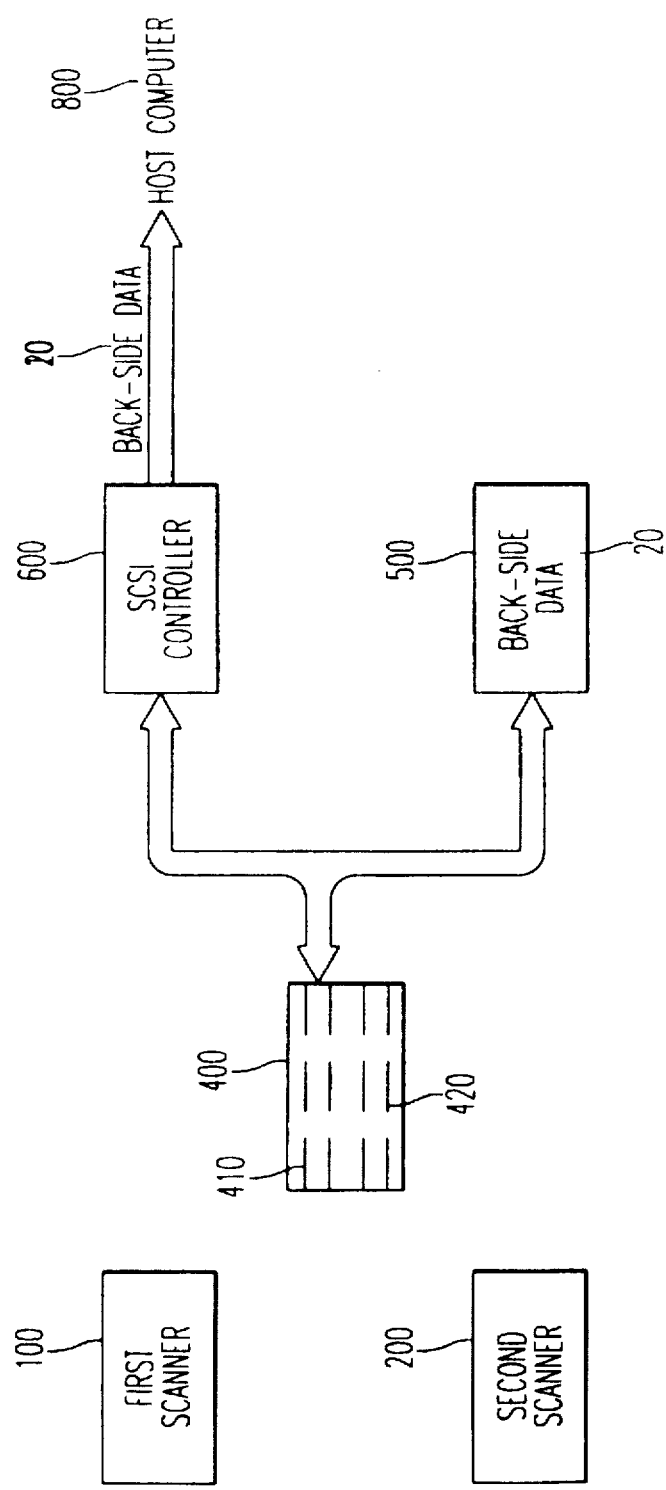
FIG. 4 illustrates flows of scanning data according to the first embodiment of the present invention.
Figure 9:
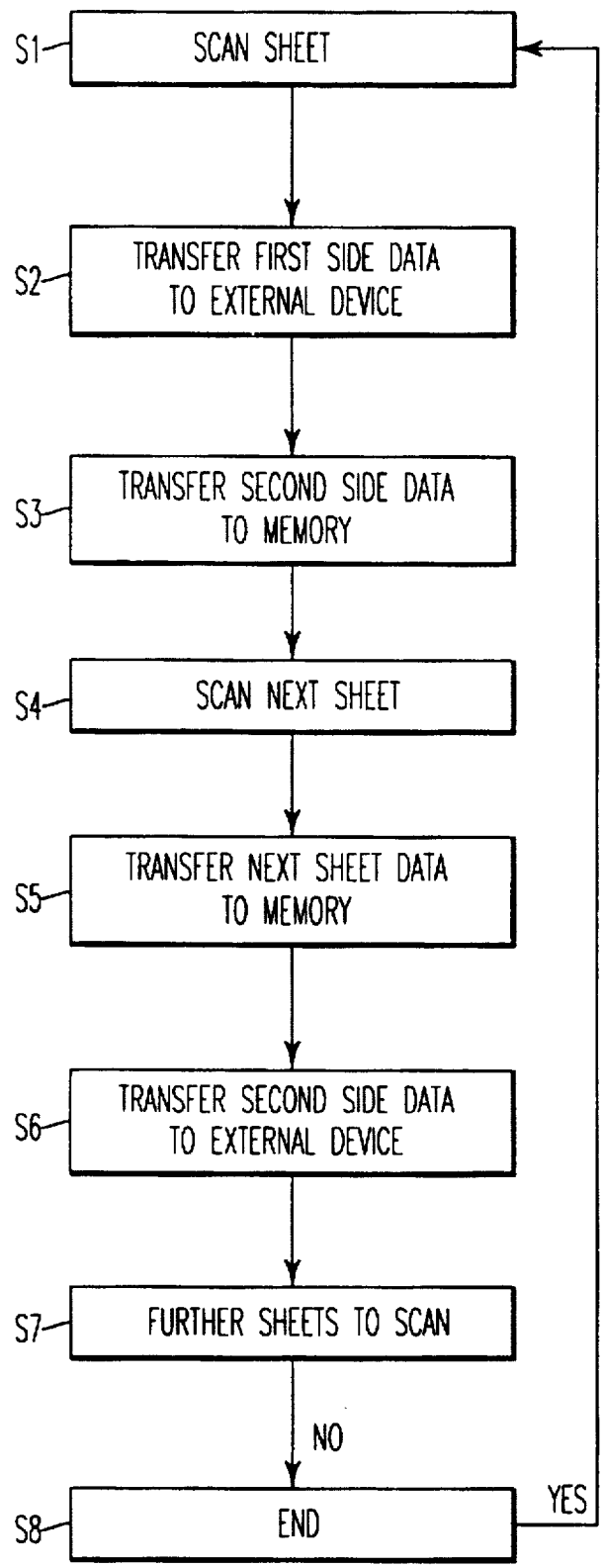
FIG. 9 illustrates in flow chart form an operation of the present invention.

FIGS. 3, 4 and 9 illustrate a process of transferring data of the first embodiment of the invention. In this embodiment, the RAM 500 may have a data capacity of one side of a document sheet, as an example.

In FIGS. 3, and 9 by an instruction indicating the sending of image data of the document 1, from the host computer 800, the document 1 is sent to the first scanner 100 and the second scanner 200, and the first scanner 100 scans the front-side data 10 and the second scanner 200 scans the back-side data 20 (see also step S1). A first channel 410 of the DMA controller 400 sends the front-side data 10 to the host computer 800 by way of SCSI controller 600 (process 1-A see solo step S3). Simultaneous with the process 1-A, a second channel 420 of the DMA controller 400 sends the back-side data 20 to the RAM 500 (process 1-B, see also step S5). The RAM 500 stores the back-side data 20 in itself (process 1-C). After finishing the processes 1-A to 1-C, a response of finishing the processes 1-A to 1-C is sent to the host computer 800.

In FIGS. 4 and 9 by an instruction indicating the sending of the back-side data 20 in the RAM 500, from the host computer 800, the first channel 410 of the DMA controller 400 sends the back-side data 20 in the RAM 500 to the host computer 800 by way of SCSI controller 600 (process 1-D see also step S11). After finishing the process 1-D, a response of finishing the process 1-D is sent to the host computer 800.

FIGS. 5 to 9 illustrate a process of transferring data of a second embodiment of the present invention. In this embodiment, the RAM 500 may have a data capacity of three sides of a document sheet, as an example.

Figure 5:
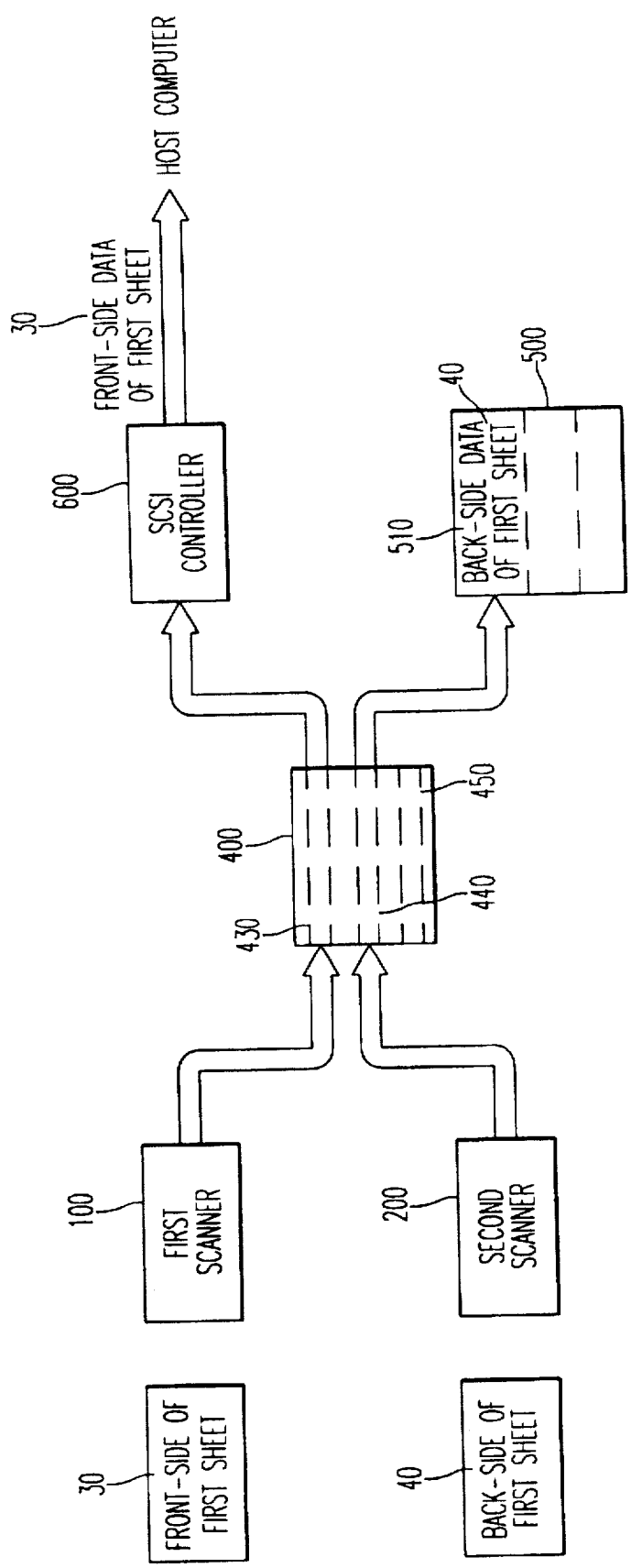
FIG. 5 illustrates flows of scanning data according to a second embodiment of the present invention.

In FIGS. 5 and 9 by an instruction indicating a sending of image data of a first sheet of the document 1, from the host computer 800, a first sheet of the document 1 is sent to the first scanner 100 and the second scanner 200, and the first scanner 100 scans the front-side data 30 and the second scanner 200 scans the back-side data 4D(see also S3). A first channel 430 of the DMA controller 400 sends the front-side data 30 to the host computer 800 by way of SCSI controller 600 (process 2-A). Simultaneous with the process 2-A, a second channel 440 of the DMA controller 400 sends the back-side data 40 to the RAM 500 (process 2-B, see also step S5). The RAM 500 stores the back-side data 40 in a first area 510 of the RAM (process 2-C). After finishing the processes 2-A to 2-C, a response of finishing the processes 2-A to 2-C is sent to the host computer 800.

Figure 6:
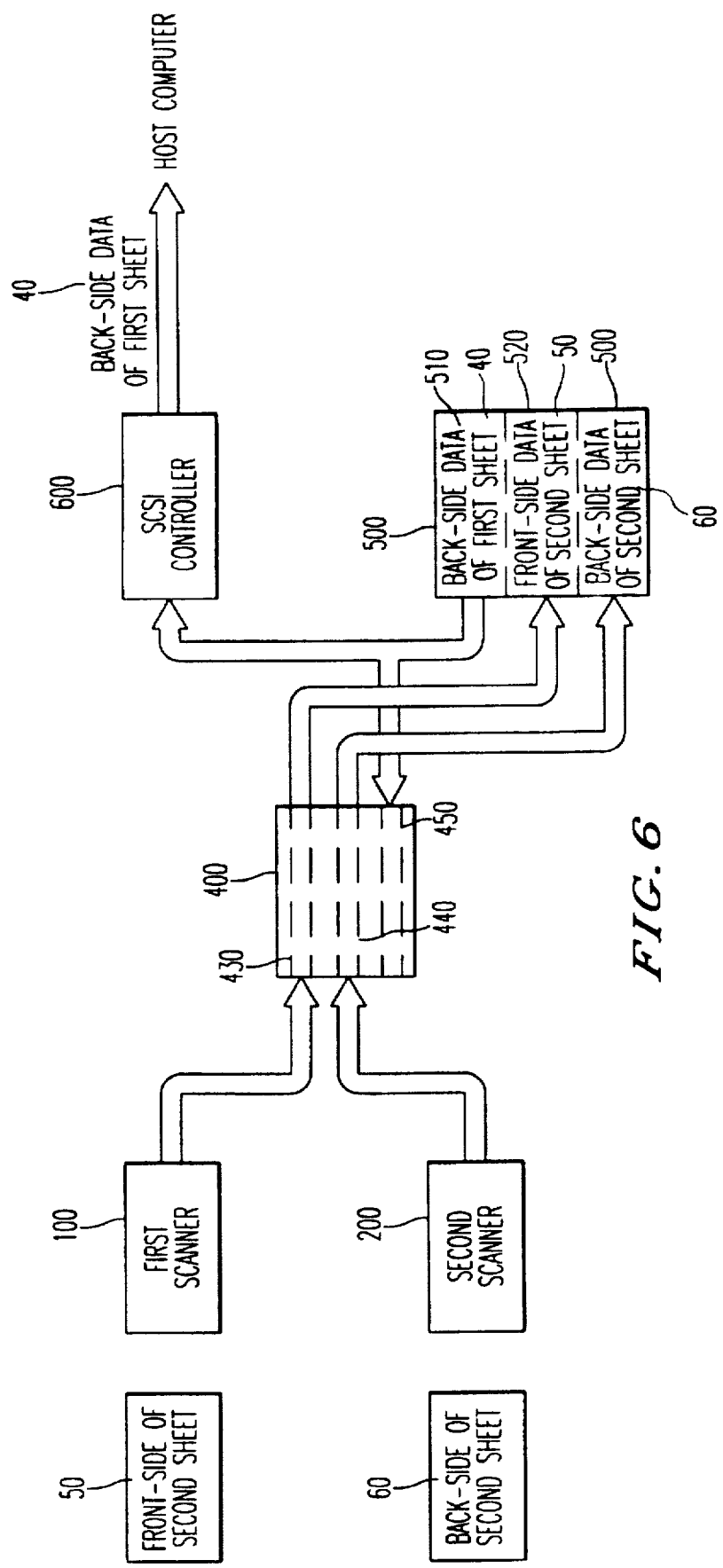
FIG. 6 illustrates flows of scanning data according to the second embodiment of the present invention.

In FIGS. 6 and 9 by an instruction indicating the scanning of image data of a second sheet of the document 1, from the host computer 800, the second sheet of the document 1 is started to be scanned by the first scanner 100 and the second scanner 200, and the first scanner 100 scans the front-side data 50 and the second scanner 200 scans the back-side data 60, and a response of receiving the instruction of scanning image data of the second sheet of the document 1 is sent to the host computer 800 (process 2-D).

The first channel 430 of the DMA controller 400 sends the front-side data 50 of the second sheet to the RAM 500 and the second channel 440 of the DMA controller 400 sends the back-side data 60 (see also step S7) of the second sheet to the RAM 500 (process 2-E, see also step S9). The RAM 500 stores the front-side 50 of the second sheet in a second area 520 of the RAM 500 and the back-side data 60 of the second sheet in a third area 530 of the RAM 500 (process 2-F). Simultaneous with process 2-E, a third channel 450 of the DMA controller 400 sends the back-side data 40 of the first sheet to the host computer 800 by the way of SCSI controller 600 (see also step S11). And a response of finishing the process is sent to the host computer 800 (process 2-G).

Figure 7:
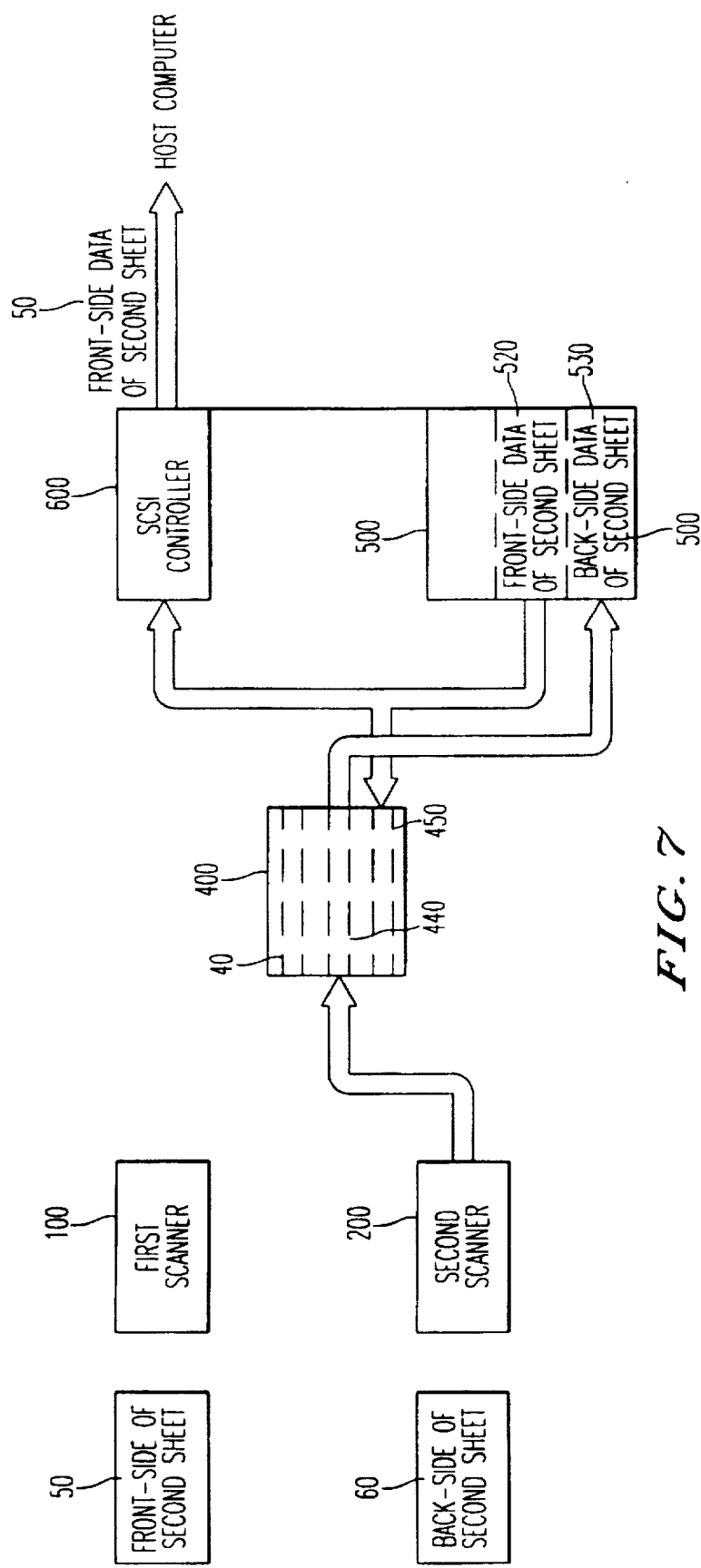
FIG. 7 illustrates flows of scanning data according to the second embodiment of the present invention.

In FIG. 7, receiving an instruction of sending front-side data 50 of the second sheet, the second channel 440 of the DMA controller 400 sends the front-side data 50 of the second sheet in the second area 520 of the RAM 500 to the host computer 800 by way of SCSI controller 600. And a response of finishing the process is sent to the host computer 800 (process 2-H).

Figure 8:
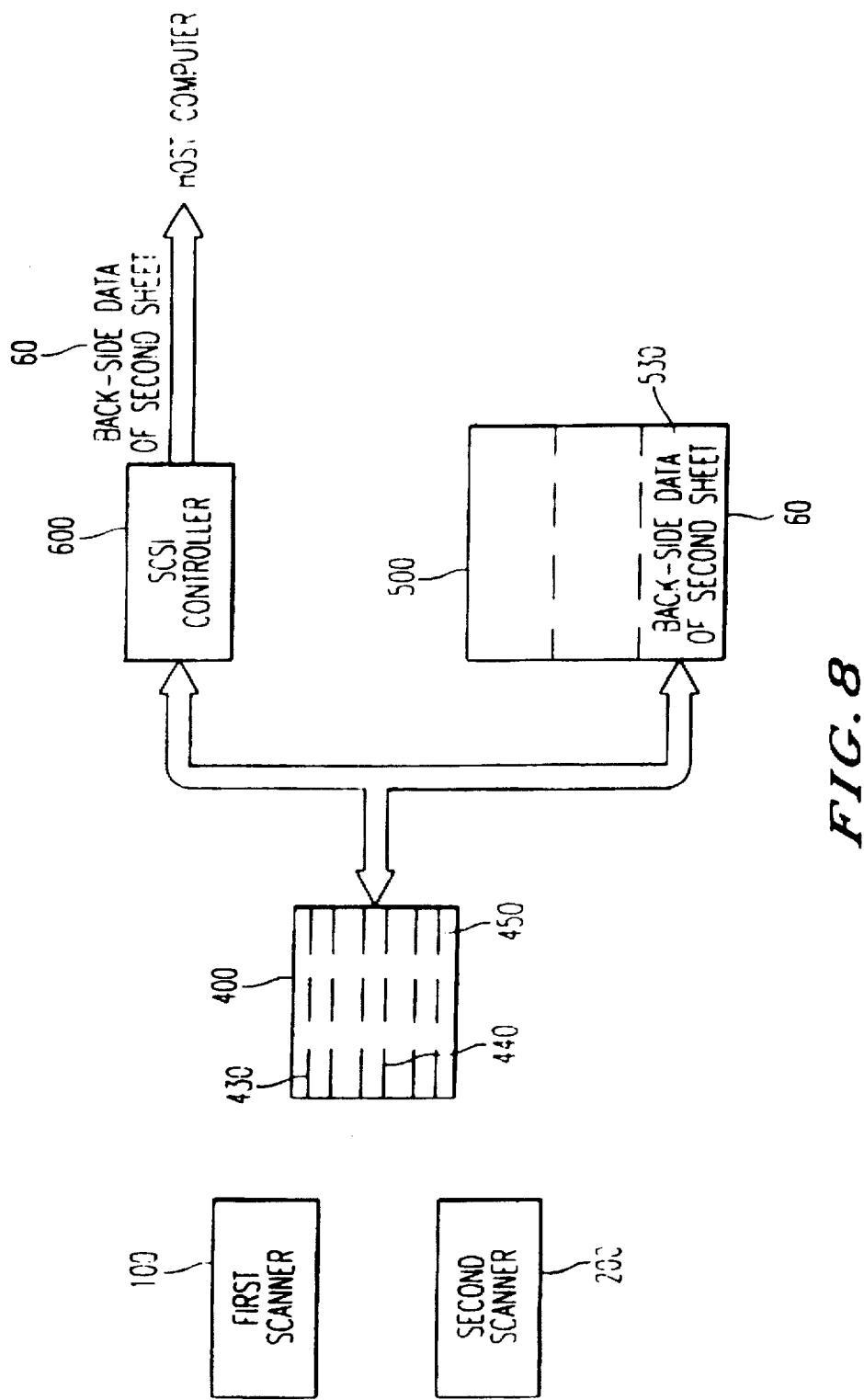
FIG. 8 illustrates flows of scanning data according to the second embodiment of the present invention.

In FIG. 8, receiving an instruction of sending backside data 60 of the second sheet, the third channel 450 of the DMA controller 400 sends the back-side data 60 of the second sheet in the third area 530 of the RAM 500 to the host computer 800 by way of SCSI controller 600. And a response of finishing the process is sent to the host computer 800 (process 2-I).

If the document 1 has three or more sheets, the process 2-A to the process 2-I are repeated for the third pages on and after(see also step S11). Or the process B to the process H are repeated for the third page on and after except for the last page, and process 1 is utilized for the last sheet of the document 1.

Obviously, numerous additional modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. A double side scanner comprising:
   a first scanner, for scanning a first side of a sheet to provide a first side data;
   a second scanner, connected to said first scanner, for scanning a second side of said sheet to provide a second side data;
   a memory, for storing said second side data;
   a first data transfer means, for transferring said first side data directly to an external device;
   a second data transfer means, for transferring said second side data to said memory;
   a third data transfer means, for transferring said second side data stored in said memory to said first data transfer means and then to said external device, after finishing data transferring by said first and second data transfer means.

2. A double side scanner as claimed in claim 1, wherein said memory has a capacity to store data of one side of said sheet data.

3. A double side scanner comprising:
   a first scanner, for scanning a first side of a plurality of sheets to provide a first side data;
   a second scanner, connected to said first scanner, for scanning a second side of said plurality of sheets to provide a second side data;
   a memory, for storing said second side data and a first and second side data of a second sheet of the plurality of sheets;
   a first data transfer means, for transferring said first side data of a first sheet of the plurality of sheets directly to an external device;
   a second data transfer means, for transferring said second side data of said first sheet of the plurality of sheets to said memory;
   a third data transfer means, for transferring said first and second side data of said second sheet of the plurality of sheets to said memory;
   a fourth data transfer means, for transferring said second side data of said first sheet stored in said memory to said first data transfer means and then to said external device, for transferring said second side data of said second sheet stored in said memory to said first data transfer means and then to said external device, and for transferring said second side data of said second sheet stored in said memory to first data transfer means and then to said external device.

4. A double side scanner as claimed in claim 3, wherein said memory has a capacity to store data of at least three sides of said plurality of sheets.

5. A double side scanner as claimed in claim 3, further comprising:
   a controller, connected to said first scanner and said second scanner and said first and second data transfer means, for controlling said first scanner and said second scanner scanning said second sheet after finishing data transfer by said first and second transfer means.

6. A double side scanner as claimed in claim 5, wherein said controller is further connected to said third and fourth data transfer means, and for further controlling said third and fourth data transfer means for transferring said data in parallel.

7. A method for controlling a double side scanner having a first scanner, for scanning a first side of a sheet to provide a first side data, and a second scanner, connected to said first scanner, for scanning a second side of said sheet to provide a second side data, comprising the steps of:
   transferring said first side data directly to an external device through a first data transfer means;
   transferring said second side data to a memory;
   transferring said second side data stored in said memory to said external device through the first data transfer means.

8. A method for controlling a double side scanner having a first scanner, for scanning a first side of a plurality of sheets to provide a first side data, and a second scanner, connected to said first scanner, for scanning a second side of said plurality of sheets to provide a second side data, comprising the steps of:
   transferring said first side data of a first sheet of the plurality of sheets directly to an external device through a first transfer means;
   transferring said second side data of said first sheet to a memory;
   scanning a second sheet of the plurality of sheets;
   first transferring said first and second data of a second sheet to said memory;
   second transferring said second side data of said first sheet stored in said memory to said external device through said first data transfer means;
   third transferring said first side data of said second sheet stored in said memory to said external device through the first data transfer means, after the second transferring step;
   fourth transferring said second side data of said second sheet stored in said memory to said external device through the first data transfer means, after the third transferring step.

9. A method as claimed in claim 8, wherein:
   said first transferring step and said second transferring step transfers said each data in parallel.

10. A double side scanner comprising:
    a first scanner, for scanning a first side of a sheet to provide a first side data;
    a second scanner, connected to said first scanner, for scanning a second side of said sheet to provide a second side data;
    a memory, for storing said second side data;
    a first data transfer means, for initially transferring said first side data directly to an external device;
    a second data transfer means, for initially transferring said second side data to said memory simultaneous with the operation of the first data transfer means initially transferring said first side data directly to the external device;
    a third data transfer means, for transferring said second side data stored in said memory to said first data transfer means and then to said external device, after finishing the initial data transferring by said first and second data transfer means.

11. A double side scanner as claimed in claim 10, wherein said memory has a capacity to store data to one side of said sheet data.

* * * * *